US012423559B2

(12) United States Patent
Liu et al.

(10) Patent No.: US 12,423,559 B2
(45) Date of Patent: Sep. 23, 2025

(54) APPARATUS AND METHODS FOR FORWARD PROPAGATION IN NEURAL NETWORKS SUPPORTING DISCRETE DATA

(71) Applicant: Cambricon Technologies Corporation Limited, Beijing (CN)

(72) Inventors: Shaoli Liu, Beijing (CN); Yong Yu, Beijing (CN); Yunji Chen, Beijing (CN); Tianshi Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 748 days.

(21) Appl. No.: 16/182,420

(22) Filed: Nov. 6, 2018

(65) Prior Publication Data

US 2019/0073584 A1 Mar. 7, 2019

Related U.S. Application Data

(63) Continuation-in-part of application No. 16/093,956, filed as application No. PCT/CN2016/079431 on Apr. 15, 2016, now abandoned.

(51) Int. Cl.
*G06N 3/045* (2023.01)
*G06F 12/0806* (2016.01)
(Continued)

(52) U.S. Cl.
CPC ......... *G06N 3/045* (2023.01); *G06F 12/0806* (2013.01); *G06N 20/00* (2019.01); *G06N 3/04* (2013.01); *G06N 5/046* (2013.01)

(58) Field of Classification Search
CPC ........ G06N 5/046; G06N 20/00; G06N 20/10; G06N 20/20; G06N 3/02; G06N 3/04; G06N 3/08; G06N 7/00
See application file for complete search history.

(56) References Cited

U.S. PATENT DOCUMENTS

| 5,638,065 A | * | 6/1997 | Hassner | G11B 20/10009 |
| | | | | 341/59 |
| 5,752,068 A | * | 5/1998 | Gilbert | G06F 15/17337 |
| | | | | 710/22 |
| 2017/0103306 A1 | * | 4/2017 | Henry | G06N 3/0635 |

FOREIGN PATENT DOCUMENTS

| CN | 101963983 A | 2/2011 |
| CN | 103399486 A | 11/2013 |

(Continued)

OTHER PUBLICATIONS

Hamalainen et al., Tutnc: A General Purpose Parallel Computer for Neural Network Computations, Microprocessors and Microsystems vol. 19 No. 8, Oct. 1995, Elsevier Science B.V., pp. 447-465 (Year: 1995).*

(Continued)

*Primary Examiner* — Daniel T Pellett
(74) *Attorney, Agent, or Firm* — Getech Law LLC; Jun Ye

(57) ABSTRACT

Aspects for forward propagation of a multilayer neural network (MNN) in a neural network processor are described herein. As an example, the aspects may include a computation module that includes a master computation module and one or more slave computation modules. The master computation module may be configured to receive one or more groups of MNN data. The one or more groups of MNN data may include input data and one or more weight values and wherein at least a portion of the input data and the weight values are stored as discrete values. The one or more slave computation modules may be configured to calculate one or more groups of slave output values based on a data type of each of the one or more groups of MNN data.

29 Claims, 10 Drawing Sheets

(51) Int. Cl.
G06N 3/04 (2023.01)
G06N 5/046 (2023.01)
G06N 20/00 (2019.01)

(56) References Cited

FOREIGN PATENT DOCUMENTS

CN 105512723 A 4/2016
WO 2016037351 A1 3/2016

OTHER PUBLICATIONS

Miyashita et al., Convolutional Neural Networks Using Logarithmic Data Representation, arXiv:1603.01025v2, Mar. 17, 2016, 10 pages (Year: 2016).*
CN 201811233426.6, Official Action Issued Dec. 6, 2019, 26 Pages.
EP 16898260.1, Official Action Issued Dec. 3, 2019, 9 Pages.
Chen; DaDianNao: A Machine-Learning Supercomputer, 7th Annual IEEE/ACM International Symposium on Microarchitecture, 2014, 13 Pages.
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Mar. 1-5, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
EP16898260.1—European Search Report, mailed Nov. 25, 2019, 5 pages.
Zhouhan Lin, et al., "Neural Networks with Few Multiplications", ICLR 2016, 9 pages.
Pedro O. Domingos, et al., "An Efficient and Scalable Architecture for Neural Networks with Backpropagation Learning", IEEE 2005, 6 pages.
EP16898260.1—Communication From Examining Division, mailed Jul. 31, 2020, 12 pages.
EP16898260.1—Summons to Attend Oral Proceedings, mailed Jul. 31, 2020, 2 pages.
Timo Hamalainen, et al., "Tutnc: A General Purpose Parallel Computer for Neural Network Computations", 1995 Elsevier Science B.V., 19 pages.
Harri Klapuri, et al., "Mapping Artificial Neural Networks to a Tree Shape Neurocomputer", Microprocessors and Microsystems 1996, 10 pages.
CN201610236955.6—Office Action, mailed Jul. 29, 2020, 21 pages.
PCT/CN2016/079431—International Search Report and Written Opinion, mailed Jan. 16, 2017, 14 pages. (with English translation).
BP neural network training algorithm based on data parallelism: Zhang Xian, "An Algorithm for Training Back-propagation Neural Networks Based on Data Parallelism", China Master's Theses Full-text Database Information and Technology, Retrieved from internet URL: http://cnki.kmlib.yn.cn/kcms/detail/detail.aspx?dbcode=CMFD&QueryID=21&CurRec=1&dbname=CMFD0911&filename=2009143814.nh., online publication date: Issue 05, 2010, 50 pages.

* cited by examiner

800

--- receiving, by a master computation module, one or more groups of MNN data from a direct memory access unit, wherein the one or more groups of MNN data include input data and one or more weight values and wherein at least a portion of the input data and the weight values are stored as discrete values
— 802 transmitting, by the master computation module, the MNN data to multiple slave computation modules via an interconnection unit, wherein the multiple slave computation modules are configured to calculate multiple groups of slave output values based on a data type of each of the one or more groups of MNN data
— 804 calculating, by the master computation module, a merged intermediate vector based on the data type of each of the one or more groups of MNN data
— 806 generating, by the master computation module, an output vector based on the merged intermediate vector
— 808

Fig. 8

APPARATUS AND METHODS FOR FORWARD PROPAGATION IN NEURAL NETWORKS SUPPORTING DISCRETE DATA

CROSS-REFERENCE TO RELATED APPLICATIONS

This application is a continuation-in-part of U.S. patent application Ser. No. 16/093,956, filed on Oct. 15, 2018, which is a 35 U.S.C. § 371 National Stage of PCT/CN2016/079431 filed on Apr. 15, 2016. The entire content of each of the aforementioned patent applications, as well as commonly owned Chinese Patent Application No. 201610236955.6 filed Apr. 15, 2016, is incorporated herein by reference.

TECHNICAL FIELD

The present disclosure generally relates to the technical field of artificial neural network, and specifically, relates to an apparatus and method for executing the forward propagation of the artificial neural network.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention.

A known method to support the forward propagation of a multilayer artificial neural network is to use a general-purpose processor. For example, a general-purpose register file and a general-purpose functional unit may be implemented to execute general-purpose instructions to support MNN algorithms. Another known method to support the forward propagation of MNNs is to use a graphics processing unit (GPU). In accordance with this method, a general-purpose register file and a general-purpose stream processing unit may be configured to execute general purpose single-instruction-multiple-data (SIMD) instructions to support the MNN algorithms.

Typically, general-purpose processors and GPUs operate based on continuous data. Continuous data may require more computational resources than discrete data. For example, a 32-bit floating-point number requires 32 bits of storage space. In addition, components designed for operating on continuous data may be structurally more complex than components for discrete data.

Discrete data representation may refer to designating one or more numbers to represent one or more discrete values. For example, typically, binary numbers, 00, 01, 10, and 11, represent continuous values, 0, 1, 2, and 3. In some examples of discrete data representation, the four binary numbers (00, 01, 10, and 11) may be designated to respectively represent discrete values, e.g., $-1$, $-\frac{1}{8}$, $\frac{1}{8}$, and 1.

According to conventional methods, computing devices for MNNs may implement continuous data representation to store floating-point numbers and/or fixed-point numbers. However, MNNs may include numerous weight values that of relatively high precision and, thus, continuous data representation may lead to large consumption of computational resources and storage space. Unlike continuous data representation, discrete data representation may require less complex hardware design and less storage space.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for forward propagation of a multilayer neural network (MNN). The example apparatus may include a computation module that includes a master computation module and one or more slave computation modules. The master computation module may be configured to receive one or more groups of MNN data, wherein the one or more groups of MNN data include input data and one or more weight values and wherein at least a portion of the input data and the weight values are stored as discrete values and transmit the MNN data to an interconnection unit. The one or more slave computation modules may be configured to receive the one or more groups of MNN data and calculate one or more groups of slave output values based on a data type of each of the one or more groups of MNN data. The master computation module may be further configured to calculate a merged intermediate vector based on the data type of each of the one or more groups of MNN data and generate an output vector based on the merged intermediate vector. The example apparatus may further include a controller unit configured to transmit one or more instructions to the computation module.

Another aspect of the present disclosure provides an example method for forward propagation of an MNN. The example method may include receiving, by a master computation module of a computation module, one or more groups of MNN data from a direct memory access unit, wherein the one or more groups of MNN data include input data and one or more weight values and wherein at least a portion of the input data and the weight values are stored as discrete values; calculating, by one or more slave computation modules of the computation module, one or more groups of slave output values based on a data type of each of the one or more groups of MNN data; calculating, by the master computation module, a merged intermediate vector based on the data type of each of the one or more groups of MNN data; and generating, by the master computation module, an output vector based on the merged intermediate vector.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 8 is a flow diagram of aspects of an example method for forward propagation computation process of neural networks according to embodiments of the present disclosure.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

The forward propagation computation of multilayer artificial neural networks according to embodiments of the present disclosure comprises operations in two or more layers. Each layer may refer to a group of operations. With respect to each layer, a dot product operation may be performed to an input vector and a weight vector. An output neuron may be obtained based on the result of the dot product operation by applying an activation function. In some examples, the activation function may be sigmoid function, tanh function, relu function, softmax function, etc.

Figure 1A:
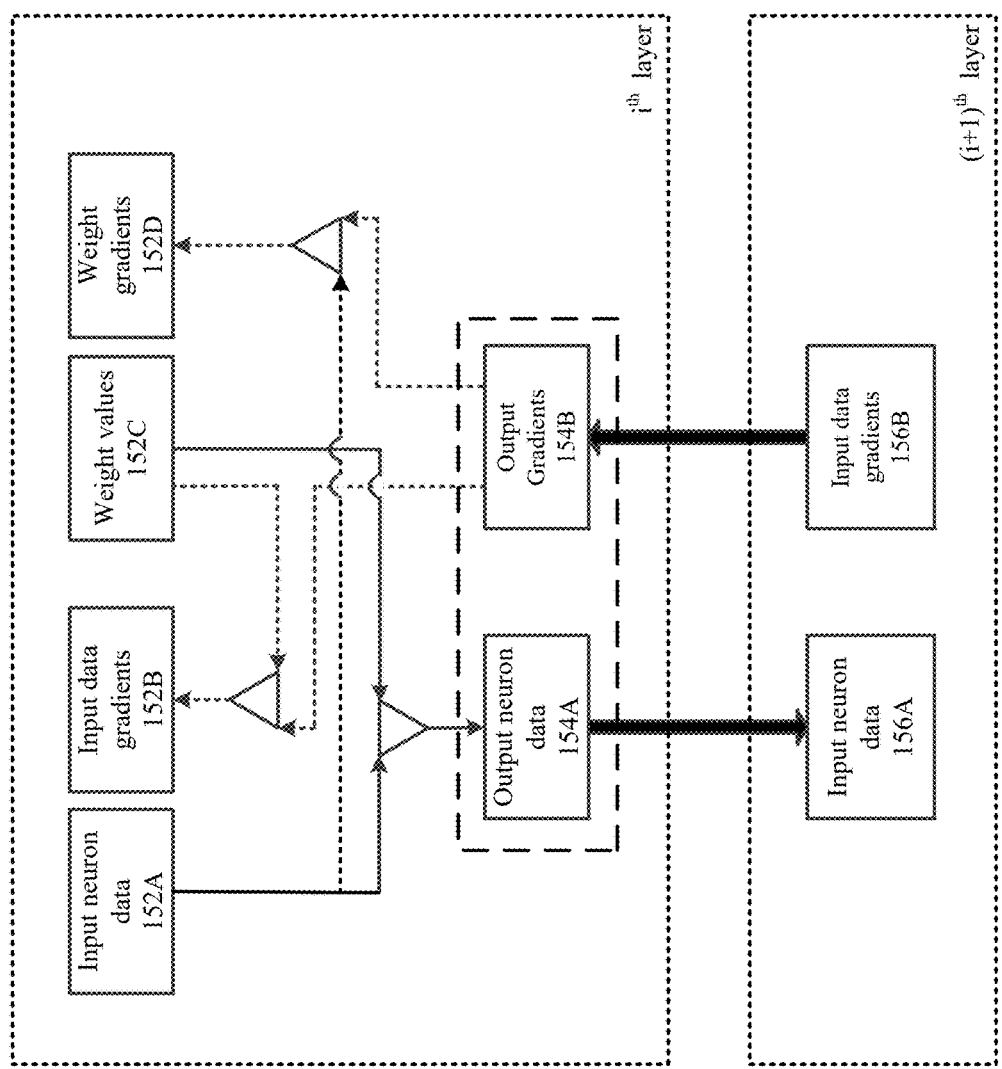
FIG. 1A is a block diagram illustrating an example computing process for MNNs.

FIG. 1A is a block diagram illustrating an example computing process 150 at a neural network processor for neural networks. The computing process 150 is a merely example showing neural network operations that involve input data and weight values and should not be limited to such operations. For example, other unshown neural network operations may include pooling operations, etc.

As depicted, the example computing process 150 may be performed from the $i^{th}$ layer to the $(i+1)^{th}$ layer. The term "layer" here may refer to a group of operations, rather than a logic or a physical layer. A triangular-shaped operator (Δ as shown in FIG. 1) may indicate one or more neural network operations. Examples of the neural network operations may include an activation function, a bias operation, a matrix multiplication, a convolution operation, or any combination thereof. It is notable that the illustrated $i^{th}$ and $(i+1)^{th}$ layers of operations may not be the first layer and the last layer of the entire process. Rather, the layers of operations may refer to any two consecutive layers in a neural network. As described below in greater detail, the computing process from the $i^{th}$ layer to the $(i+1)^{th}$ layer may be referred to as a forward propagation process; the computing process from $(i+1)^{th}$ layer to the $i^{th}$ layer may be referred to as a backward propagation (also may be interchangeably referred to as backpropagation) process.

The forward propagation process may start from input neuron data received at the $i^{th}$ layer (e.g., input neuron data 152A). Hereinafter, input neuron data may refer to the input data at each layer of operations, rather than the input data of the entire neural network. Similarly, output neuron data may refer to the output data at each layer of operations, rather than the output data of the entire neural network.

The received input neuron data 152A may be multiplied or convolved by one or more weight values 152C. The results of the multiplication or convolution may be transmitted as output neuron data 154A. The output neuron data 154A may be transmitted to the next layer (e.g., the $(i+1)^{th}$ layer) as input neuron data 156A. The forward propagation process may be shown as the solid lines in FIG. 1A.

In some examples, input data and weight values represented and stored as continuous data may be converted to discrete values. Thus, the dot production operations in the MNN may be broken down to sub-operations including bit-shifting, bitwise NOT (or complement), exclusive OR (or exclusive disjunction), or any combination thereof. Further, with respect to each layer, a data type (i.e., discrete or continuous data) of the input neuron data or the weight values at the layer may be selected by a system administrator prior to the forward propagation process. If discrete data is selected for a layer, the system administrator may further set the bit length of discrete data for this layer. For example, the bit length of the discrete data may be set to 1 bit, 2 bits, or 3 bits. Respectively, the discrete data may represent 2, 4, or 8 discrete values.

The backward propagation process may start from the last layer of the forward propagation process. For example, the backward propagation process may include the process from the $(i+1)^{th}$ layer to the $n^{th}$ layer. During the process, the input data gradients 156B may be transmitted to the $n^{th}$ layer as output gradients 154B. The output gradients 154B may then be multiplied or convolved by the input neuron data 152A to generate weight gradients 152D. Additionally, the output gradients 154B may be multiplied by the weight values 152C to generate input data gradients 152B. The backward propagation process may be shown as the dotted lines in FIG. 1A.

Figure 1B:
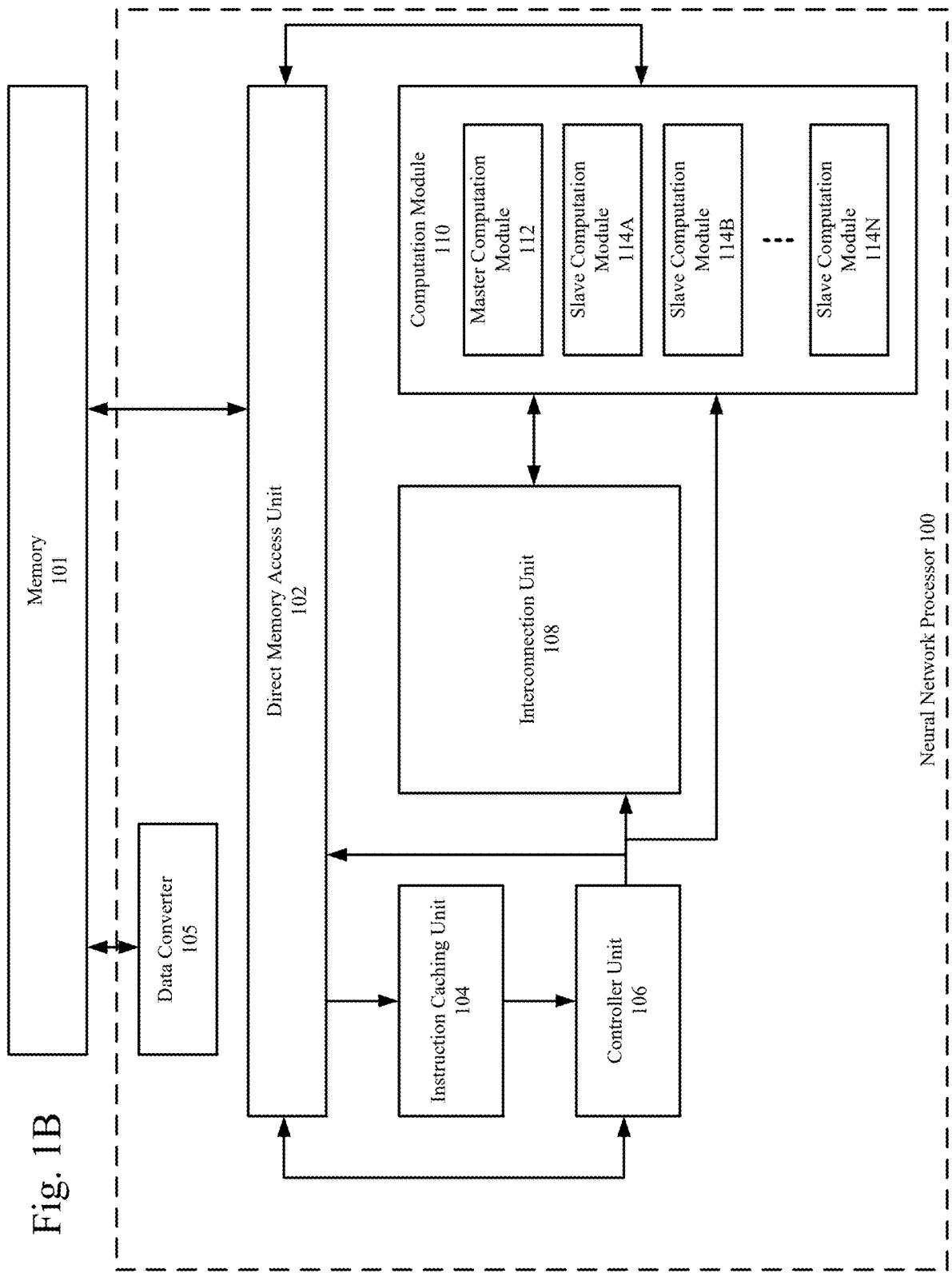
FIG. 1B illustrates a block diagram of the overall structure of a neural network processor for performing a forward propagation operation of artificial neural networks according to embodiments of the present disclosure.

FIG. 1B illustrates a block diagram of the general structure of a neural network processor 100 for performing a forward propagation operation of artificial neural networks according to embodiments of the present disclosure. As shown in FIG. 1B, the apparatus comprises an instruction caching unit 104, a data converter 105, a controller unit 106, a direct memory access unit 102, an interconnection unit 108, a computation module 110 including a master computation module 112 and one or more slave computation modules 114 (e.g., 114A-114N). The instruction caching unit 104, the data converter 105, the controller unit 106, the direct memory access unit 102, the interconnection unit 108, the master computation module 112 and the slave computation modules 114 may be implemented in hardware circuits (for example, an application-specific integrated circuit (ASIC)).

In some examples, the instruction caching unit 104 may be configured to receive or read instructions from the direct memory access unit 102 and cache the received instructions. The controller unit 106 may be configured to read instructions from the instruction caching unit 104 and decode one of the instructions into micro-instructions for controlling operations of other modules including the direct memory access unit 102, the master computation module 112, the slave computation modules 114, etc. In other words, the modules including the direct memory access unit 102, the master computation module 112, and the slave computation modules 114 may be configured to respectively perform the micro-instructions.

The direct memory access unit 102 may be configured to access an external address range (e.g., in an external storage device such as a memory 101) and directly read or write data into respective caching units in the computation module 110.

In some examples, the data converter 105 may be configured to receive continuous data from the memory 101 and convert the continuous data into discrete data that may represent multiple discrete values. The discrete data may be further transmitted back to the memory 101.

Figure 1C:
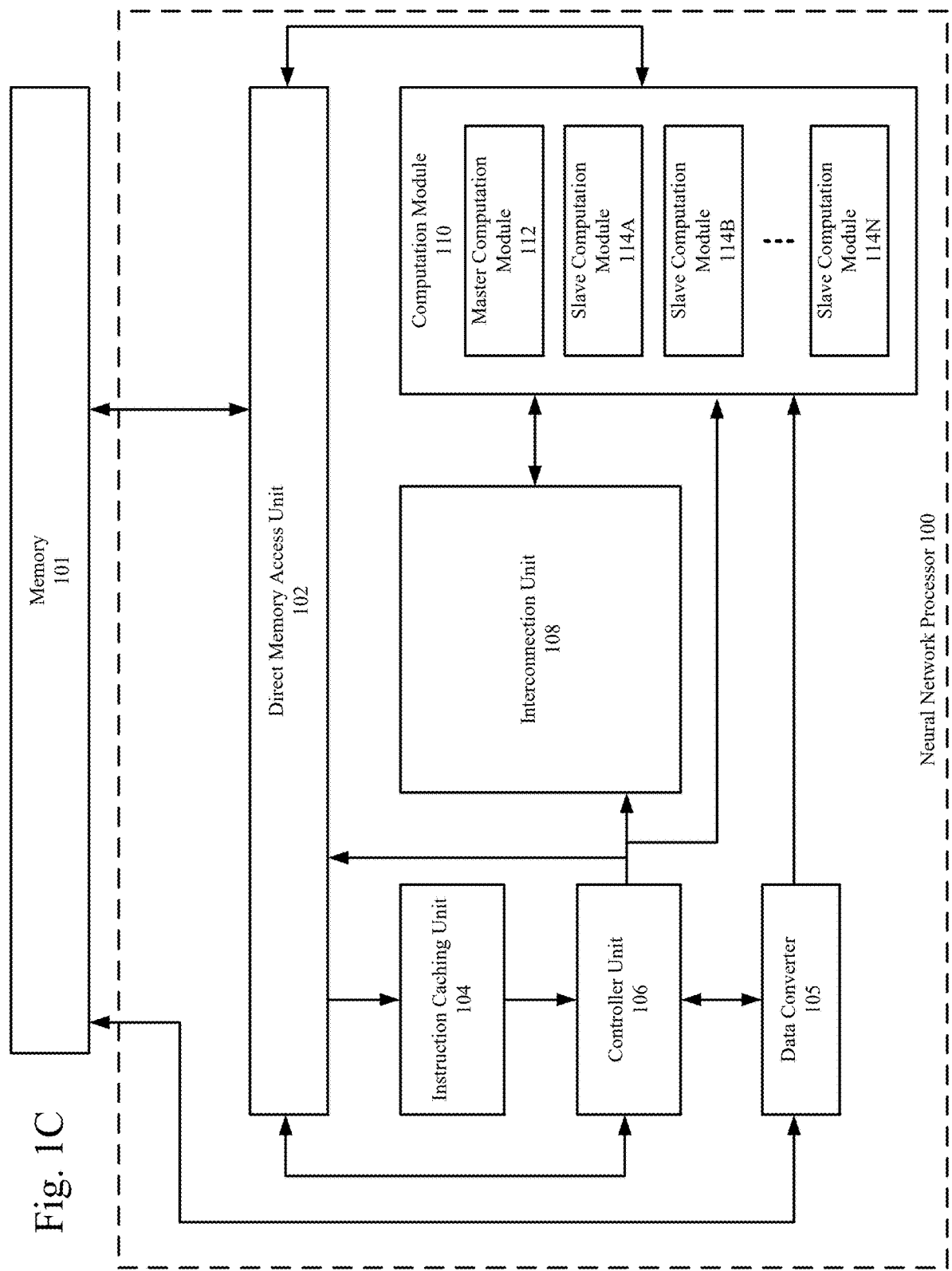
FIG. 1C illustrates a block diagram of another structure of a neural network processor for performing a forward propagation operation of artificial neural networks according to embodiments of the present disclosure.

FIG. 1C illustrates another block diagram of the overall structure of a neural network processor for performing a forward propagation operation of artificial neural networks according to embodiments of the present disclosure. As depicted, the data converter 105 may be configured to directly transmit the discrete data to the computation module 110. Further, the data converter 105 may be included in the computation module 110, e.g., in the master computation module 112 or in each of the slave computation modules 114.

Figure 2:
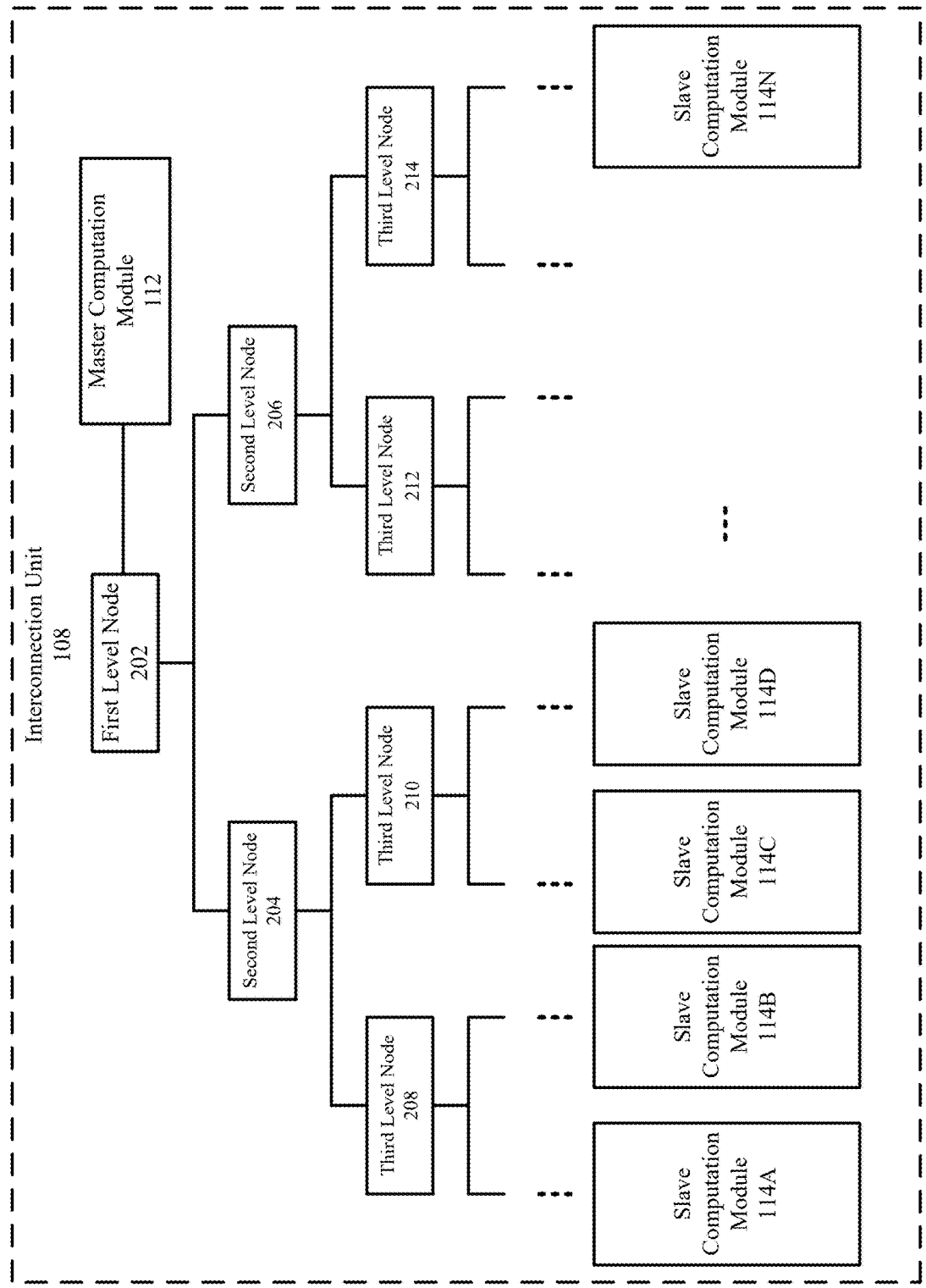
FIG. 2 illustrates the structure of the interconnection unit in the neural network processor for performing a forward propagation operation of artificial neural networks according to embodiments of the present disclosure.

FIG. 2 illustrates the structure of the interconnection unit 108 in the neural network processor 100 for performing a forward propagation operation of artificial neural networks according to embodiments of the present disclosure. As depicted, the interconnection module 108 may be structured as a binary tree that includes multiple levels (e.g., from the first/top level to lower levels). Each level may include one or more nodes. Each node may be configured to send data to two nodes at a lower level. Further, each node may be configured to combine the data received from two nodes at a lower level. For example, the received data (e.g., values a and b) from the two nodes at the lower level may be combined into a 2-dimensional vector (e.g., vector (a, b)) by the node at this level. The combined data, i.e., the 2-dimensional vector may be transmitted to a node at a higher level and further combined into a 4-dimensional vector. Alternatively, or additionally, each node may be configured to add data received from the two nodes at the lower level (e.g., a and b) and the sum of the addition (e.g., a+b) may be sent to the node at the high level.

For example, in the initial computing stage of artificial neural networks in each layer, the input data (e.g., input neuron data 152A) may be transmitted to respective slave computation modules 114 by the master computation module 112 via the interconnection unit 108. In at least some examples, the input data may refer to an input vector or a segment of the input vector.

When the computation process of the slave computation modules 114 completes, the respective result of the computation process at each of slave computation modules 114 may be output as a slave output value. The slave output values may be transmitted to the interconnection unit 108 and combined by the interconnection unit 108 into an intermediate result vector.

Taking a full connection layer of the neural network as an example, with respect to an $i^{th}$ layer, the length of the input vector may be represented as $L_i$ and the length of the output vector may be represented as $L_{i+1}$. In the case where the number of the slave computation modules 114 may be represented as N, the length of the input vector may be shown as $L_i$=mN+n, in which m and n may refer to an integer equal to or greater than zero.

In the example where $L_i$ is greater than N, the slave computation modules 114 may be configured to sequentially process segments of the input vector at different time slots. Each segment of the input vector may include a number of elements, e.g., N elements. In the first time slot, the slave computation modules 114 may be configured to process the first segment of the input vector and to further process other segments later.

In at least some example, the master computation module 112 may be configured to supplement one or more zero values to the input vector such that the input vector may be divided into multiple segments and the length of each segment may be equal to the number of slave computation modules 114. For example, the master computation module 112 may supplement N-n zero values to the input value such that the modified length of input vector $L_i'$ may equal to (m+1)N.

With respect to a segment of the input vector at the $i^{th}$ layer, a slave computation module (e.g., 114J) may be configured to calculate one element (e.g., the $j^{th}$ element) in the segment and output the calculated element as a slave output value.

The slave output values, which are calculated by the one or more slave computation modules, of this segment of the input vector may be combined into an intermediate result vector by the interconnection unit 108. One or more intermediate result vectors generated based on the segments of the input vector may be further combined by the master computation module 112 to generate a merged intermediate vector. The merged intermediate vector may be further processed by the master computation module 112 to generate an output vector.

Figure 3:
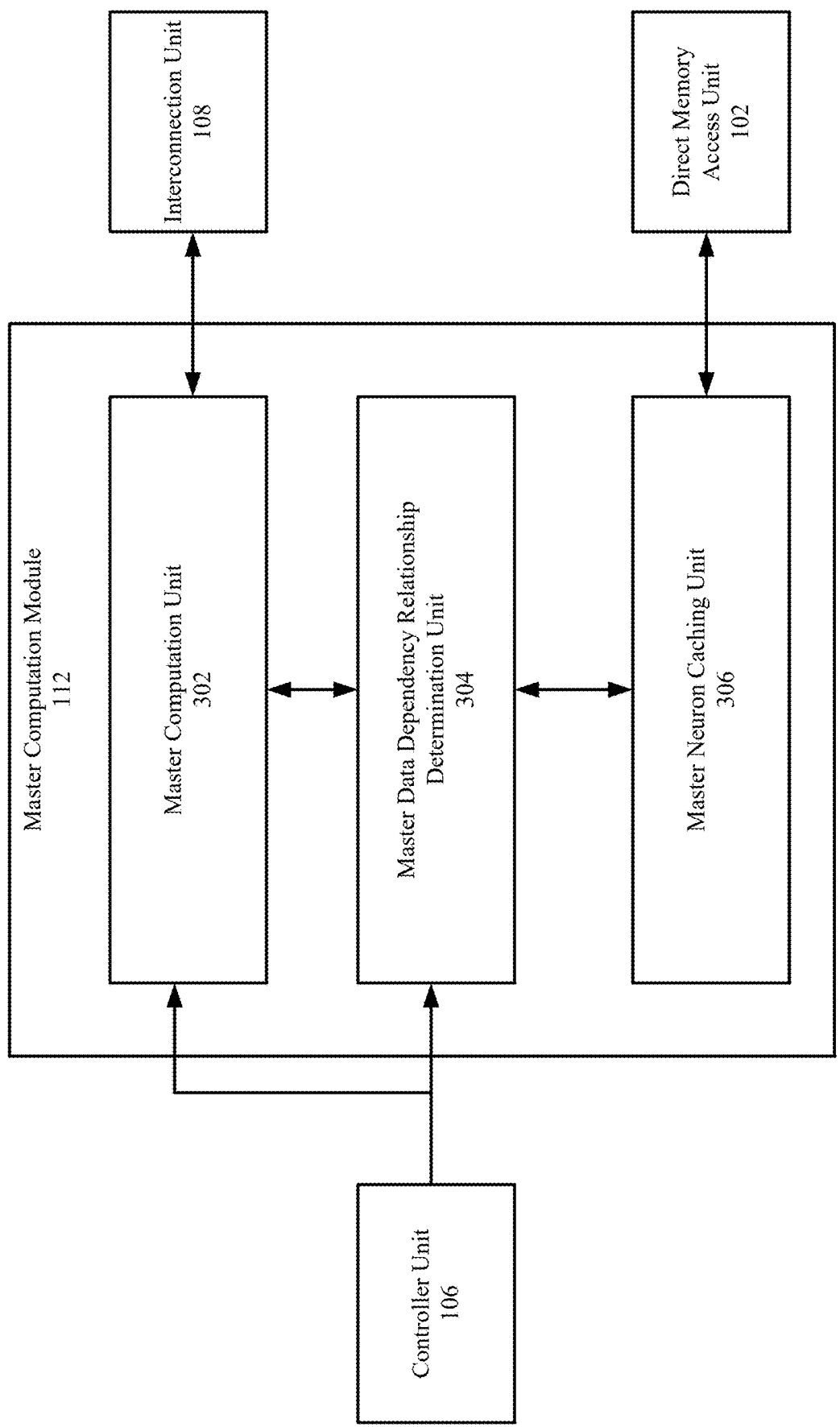
FIG. 3 illustrates a block diagram of the structure of a master computation module in the neural network processor for performing a forward propagation computation of artificial neural networks according to embodiments of the present disclosure.

FIG. 3 illustrates a block diagram of the structure of the master computation module 112 in the neural network processor 100 for performing a forward propagation computation of artificial neural networks according to embodiments of the present disclosure. As shown in FIG. 3, the master computation module 112 may include a master computation unit 302, a master data dependency relationship determination unit 304, and a master neuron caching unit 306. Hereinafter, a caching unit (e.g., the master neuron caching unit 306, a slave neuron caching unit 406, a weight value caching unit 408, etc.) may refer to an on-chip caching unit integrated in the neural network processor 100, rather than other storage devices in memory 101 or other external devices. In some examples, the on-chip caching unit may be implemented as an on-chip buffer, an on-chip Static Random Access Memory (SRAM), or other types of on-chip storage devices that may provide higher access speed than the external memory.

The master neuron caching unit 306 is configured to cache or temporarily store the data input and output by the master computation module 112 in the computing process 150 shown in FIG. 1A (e.g., input neuron data 152A, output neuron data 154A, etc.). The master data dependency relationship determination unit 304 may serve as an interface between the master computation unit 302 and the master neuron caching unit 306 to prevent read-write inconsistency of data in the master neuron caching unit 306. Further, the master data dependency relationship determination unit 304 may be configured to transmit the input vector or the segments of the input vector to the slave computation modules 114 via the master computation unit 302. The results of the processing at the slave computation modules 114 may be output from the slave computation modules 114 and be received by the master computation unit 302 via the interconnection unit 108. Instructions may be transmitted by the controller unit 106 to the master computation unit 302 and the master data dependency relationship determination unit 304 to control their operations.

In some examples, the master computation unit 302 may be configured to receive MNN data (e.g., input data, input neuron data, weight values, etc.) from the controller unit 106 or from the direct memory access unit 102. As described above, the master computation unit 302 may be configured to further transmit the MNN data to the one or more slave computation modules 114 and calculate a merged intermediate vector based on the calculation results of the slave computation modules 114.

Further to the examples, the calculation of the merged intermediate vector may be further based on the data type of the MNN data (i.e., the input data and/or the weight values). For instance, the master computation unit 302 may be configured to first determine whether the received data is discrete data, continuous data, or hybrid data that includes both continuous data and discrete data. If the received data is determined to be continuous data, following processes at the master computation module 112 may be similar to conventional processes.

In an example where all the received data is determined to be discrete data, the master computation unit 302 may be configured to look up for a result in a prestored table. For example, a 2-bit discrete data may represent four discrete values (e.g., 00, 01, 10, 11 respectively represents −1, −0.5, 0.125, 2). With respect to each operation, a table may be created and prestored at the master computation unit 302. A table for addition may be created as follows.

TABLE 1

(Addition for discrete values)

| Addition | | Discrete Value | Discrete Value | Discrete Value | Discrete Value |
|---|---|---|---|---|---|
| Discrete Value | | −1 | −0.5 | 0.125 | 2 |
| Discrete Value | −1 | Result: −2 | Result: −1.5 | Result: −0.875 | Result: 1 |
| Discrete Value | −0.5 | Result: −1.5 | Result: −1 | Result: −0.375 | Result: 1.5 |
| Discrete Value | 0.125 | Result: −0.875 | Result: −0.375 | Result: 0.25 | Result: 2.125 |
| Discrete Value | 2 | Result: 1 | Result: 1.5 | Result: 2.125 | Result: 4 |

Similarly, other tables may be created respectively for other operations, such as multiplication, subtraction, etc.

In some other examples where the received data includes both continuous data and discrete data, the master computation unit 302 may be configured to select one or more operations from a group of prestored operations, the selected operation corresponding to the discrete value. The group of prestored operations may include bit manipulation operations such as bit shifting, bitwise AND, bitwise XOR (exclusive or), bitwise NOT, etc. For example, when the master computation unit 302 receives a discrete value 01 (representing −0.5 as previously indicated) and a continuous value 16 and the master computation unit 302 is instructed to perform a multiplication operation for the received values (i.e., −0.5×16), the master computation unit 302 may be configured to select one or more operations corresponding to the discrete value 01 in an index of multiplication operation. For example, in the index of multiplication, the discrete value 01 may be preset to correspond to a series of operations including inverting the sign bit of the continuous value (e.g., from 00010000 to 10010000) and right shifting the inverted continuous value by one bit (e.g., from 10010000 to 10001000). By applying the series of operation to the continuous value 16, the master computation unit 302 may generate the result of the multiplication operation, i.e., 10001000 or −8.

In a similar example, the master computation unit 302 may receive a discrete value 11 (representing 2 as previously indicated) and the same continuous value 16 and may be instructed to perform a division operation, i.e., 16 divided by 2. The master computation unit 302 may be configured to select one or more operations in an index of division. In this example, the discrete value 11 may be preset to correspond to right shifting the continuous value by one bit (e.g., from 00010000 to 00001000). By applying the right shifting operation to the continuous value 16, the master computation unit 302 may generate the result of the division operation, i.e., 00001000 or 8.

Figure 5:
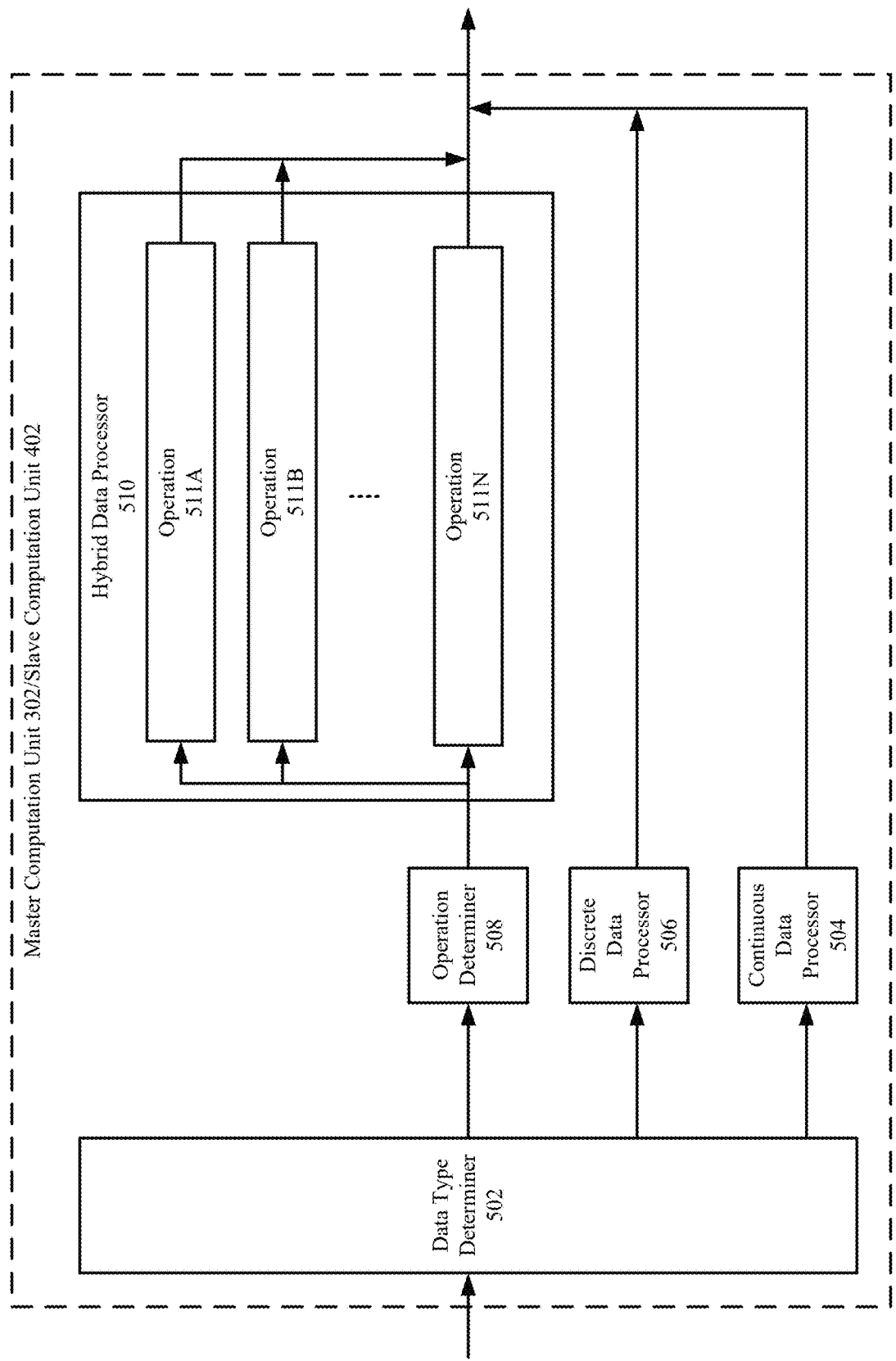
FIG. 5 is a block diagram of the structure of a master computation unit or a slave computation unit in the neural network processor for performing a forward propagation computation of artificial neural networks according to embodiments of the present disclosure.

The master computation unit 302 and components thereof are described in greater detail in accordance with FIG. 5.

Further to the examples, based on the merged intermediate vector, the master computation module 112 may be further configured to calculate an output vector.

Figure 4:
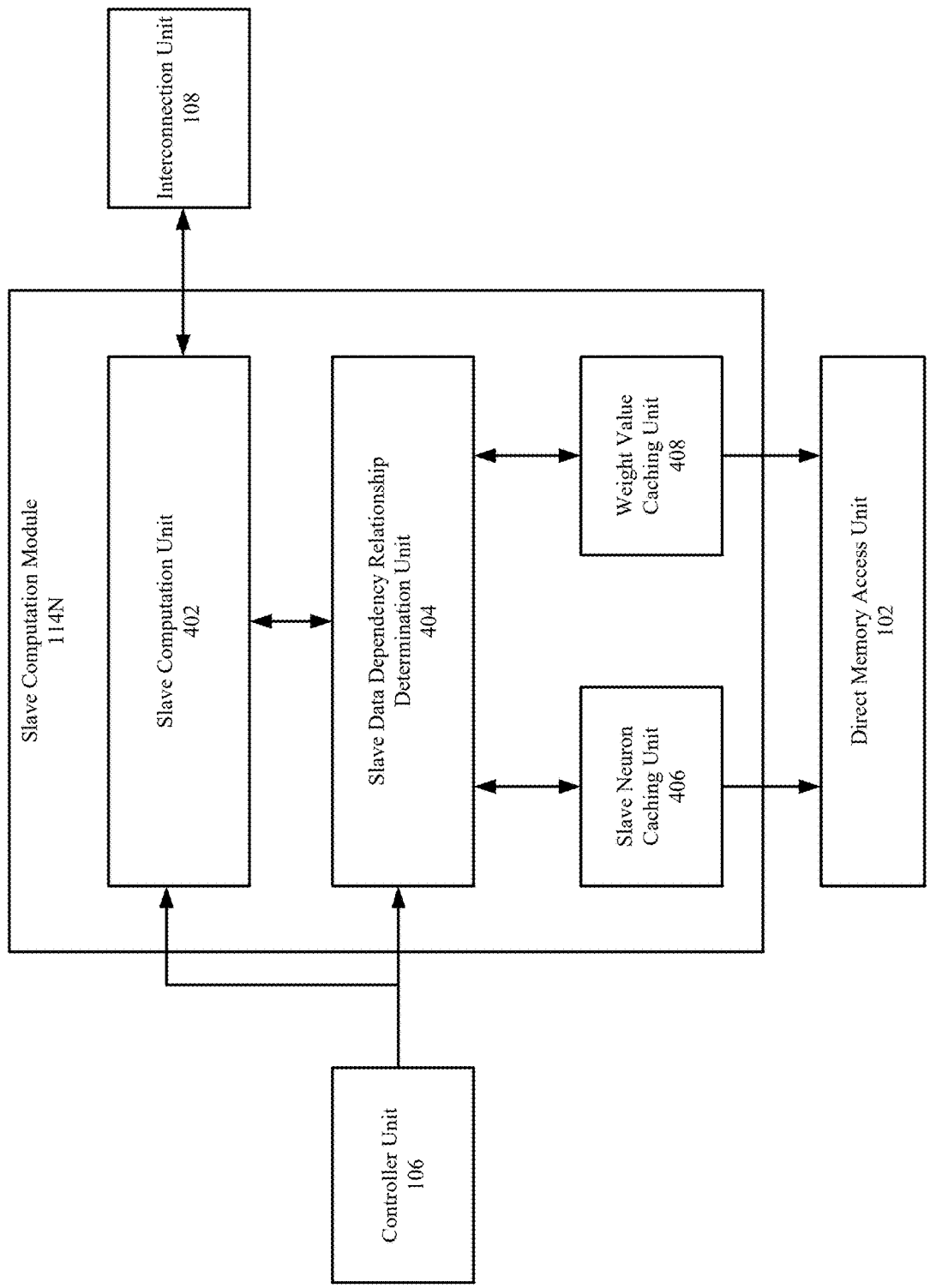
FIG. 4 is a block diagram of the structure of a slave computation module in the neural network processor for performing a forward propagation computation of artificial neural networks according to embodiments of the present disclosure.

FIG. 4 is a block diagram of the structure of the slave computation modules 114 in the neural network processor 100 for performing a forward propagation computation of artificial neural networks according to embodiments of the present disclosure. As shown in FIG. 4, each of slave computation modules 114 (e.g., slave computation module 114N as shown) may include a slave computation unit 402, a slave data dependency relationship determination unit 404, a slave neuron caching unit 406, and a weight value caching unit 408.

The slave computation unit 402 may be configured to receive micro-instructions transmitted from the controller unit 106 and to perform arithmetic and/or logical operations. The slave data dependency relationship determination unit 404 may be configured to perform reading/writing operations to the slave neuron caching unit 406. Before performing the reading/writing operations, the slave data dependency relationship determination unit 408 may be configured to determine that there is no conflict in the reading/writing consistency in the data used by the micro-instructions. For example, all micro-instructions transmitted to the slave data dependency relationship determination unit 404 may be stored in an instruction queue within the slave data dependency relationship determination unit 404. The instruction queue may indicate the relative priorities of the stored micro-instructions. In this instruction queue, if the range to be read indicated by the reading micro-instruction conflicts with the range to be written according to the writing micro-instruction of higher priority in the front of the instruction queue, then the reading micro-instruction cannot be executed unless the writing instruction that it depends on is executed.

The slave neuron caching unit 406 may be configured to cache the input vector and the slave output value generated by the slave computation unit 402.

The weight value caching unit 408 may be configured to cache the weight values for the slave computation unit 402 in the process. For each of slave computation modules 114, the weight value caching unit 408 may be configured to store a portion of the weight matrix, e.g., a submatrix of the weight matrix.

The slave computation modules 114 may be configured to process portions of the forward propagation computation that may be calculated parallelly. Taking a full connection layer of the neural network (e.g., the $i^{th}$ layer in FIG. 1A) as an example, the forward propagation process may be represented by out=f(w×in+b), in which w represents the weight matrix, in represents the input vector, b represents a bias value, f( ) represents an activation function, and out represents the output vector. The input vector and the output vector may both be column vectors. For example, the weight matrix may be in the form of $$\begin{pmatrix} W_{11} & W_{12} & W_{13} & \cdots & W_{1j} & \cdots & W_{1L_i} \\ W_{21} & W_{22} & W_{23} & \cdots & W_{2j} & \cdots & W_{2L_i} \\ W_{31} & W_{32} & W_{33} & \cdots & W_{3j} & \cdots & W_{3L_i} \\ \vdots & \vdots & \vdots & \vdots & \vdots & \vdots & \vdots \\ W_{j1} & W_{j2} & W_{j3} & \cdots & W_{jj} & \cdots & W_{jL_i} \\ \vdots & \vdots & \vdots & \vdots & \vdots & \vdots & \vdots \\ W_{L_{i+1}1} & W_{L_{i+1}2} & W_{L_{i+1}3} & \cdots & W_{L_{i+1}j} & \cdots & W_{L_{i+1}L_i} \end{pmatrix}$$

and the input vector may be represented as $$\begin{pmatrix} in_1 \\ in_2 \\ in_3 \\ \vdots \\ in_j \\ \vdots \\ in_N \\ \vdots \\ in_{L_i} \end{pmatrix}.$$

As described above, the input vector may be segmented. The segments of the input vector may be sequentially processed by the slave computation modules 114. In at least some examples, the length of each segment of the input vector may be determined based on the number of the slave computation modules 114. For example, the length of each segment may be determined to be N. For example, the first segment of the input vector may be represented as $$\begin{pmatrix} in_1 \\ in_2 \\ in_3 \\ \vdots \\ in_j \\ \vdots \\ in_N \end{pmatrix}.$$

The first segment may be transmitted to and stored in the slave computation modules 114. Further, the weight matrix may be divided into multiple submatrices respectively corresponding to different segments of the input vector. Each submatrix may be an N×N matrix include N column vectors and N row vectors. For example, the submatrix corresponding to the first segment of the input vector may be the top left submatrix in the weight matrix, i.e., $$\begin{pmatrix} W_{11} & W_{12} & W_{13} & \cdots & W_{1j} & \cdots & W_{1N} \\ W_{21} & W_{22} & W_{23} & \cdots & W_{2j} & \cdots & W_{2N} \\ W_{31} & W_{32} & W_{33} & \cdots & W_{3j} & \cdots & W_{3N} \\ \vdots & \vdots & \vdots & \vdots & \vdots & \vdots & \vdots \\ W_{j1} & W_{j2} & W_{j3} & \cdots & W_{jj} & \cdots & W_{jN} \\ \vdots & \vdots & \vdots & \vdots & \vdots & \vdots & \vdots \\ W_{N1} & W_{N2} & W_{N3} & \cdots & W_{Ni} & \cdots & W_{NN} \end{pmatrix}.$$

Taking the first segment of the input vector as an example, the slave computation modules 114 may be configured to calculate a result of the multiplication of the above submatrix of the weight matrix and the first segment of the input vector. The multiplication may be represented as $$\begin{pmatrix} W_{11} & W_{12} & W_{13} & \cdots & W_{1j} & \cdots & W_{1N} \\ W_{21} & W_{22} & W_{23} & \cdots & W_{2j} & \cdots & W_{2N} \\ W_{31} & W_{32} & W_{33} & \cdots & W_{3j} & \cdots & W_{3N} \\ \vdots & \vdots & \vdots & \vdots & \vdots & \vdots & \vdots \\ W_{j1} & W_{j2} & W_{j3} & \cdots & W_{jj} & \cdots & W_{jN} \\ \vdots & \vdots & \vdots & \vdots & \vdots & \vdots & \vdots \\ W_{N1} & W_{N2} & W_{N3} & \cdots & W_{Nj} & \cdots & W_{NN} \end{pmatrix} \begin{pmatrix} in_1 \\ in_2 \\ in_3 \\ \vdots \\ in_j \\ \vdots \\ in_N \end{pmatrix},$$

which may be further shown as $$\begin{pmatrix} W_{11} \cdot in_1 + W_{12} \cdot in_2 + \cdots + W_{1j} \cdot in_j + \cdots + W_{1N} \cdot in_N \\ W_{21} \cdot in_1 + W_{22} \cdot in_2 + \cdots + W_{2j} \cdot in_j + \cdots + W_{2N} \cdot in_N \\ W_{31} \cdot in_1 + W_{32} \cdot in_2 + \cdots + W_{3j} \cdot in_j + \cdots + W_{3N} \cdot in_N \\ \vdots \\ W_{j1} \cdot in_1 + W_{j2} \cdot in_2 + \cdots + W_{jj} \cdot in_j + \cdots + W_{jN} \cdot in_N \\ \vdots \\ W_{N1} \cdot in_1 + W_{N2} \cdot in_2 + \cdots + W_{Nj} \cdot in_j + \cdots + W_{NN} \cdot in_N \end{pmatrix}.$$

Each of the slave computation modules 114 may be configured to calculate the multiplication between a row vector in the submatrix with the first segment of the input vector. For example, the $j^{th}$ slave computation module 114J may be configured to calculate the multiplication between the segment $$\begin{pmatrix} in_1 \\ in_2 \\ in_3 \\ \vdots \\ in_j \\ \vdots \\ in_N \end{pmatrix}$$

and the $j^{th}$ weight row vector $(W_{j1}, W_{j2}, W_{j3}, \ldots W_{jj}, \ldots W_{jN})$ to generate a slave output value: $(W_{j1} \cdot in_1 + W_{j2} \cdot in_2 + \ldots + W_{jj} \cdot in_j + \ldots + W_{jN} \cdot in_N)$. The weight value caching unit 408 included in the $j^{th}$ one of the slave computation modules 114 may be configured to only store the weight values relevant to the multiplication, e.g., the $j^{th}$ weight row vector.

With respect to other segments of the input vector, e.g., $$\begin{pmatrix} in_{k+1} \\ in_{k+2} \\ in_{k+3} \\ \vdots \\ in_{k+j} \\ \vdots \\ in_{k+N} \end{pmatrix},$$

one of the slave computation modules 114 (e.g., 114N) may be configured to perform a similar multiplication between the segment and a corresponding submatrix of the weight matrix to generate a slave output value.

In the process of calculating the slave output value, the slave computation module 114N may also be configured to determine the data type of the input data and/or the weight values and to process according to the determined data type (i.e., discrete data or continuous data). In more detail, the slave computation unit 402 may be configured to first determine whether the received data is discrete data, continuous data, or hybrid data that includes both continuous data and discrete data. If the received data is determined to be continuous data, following processes at the master computation module 114 may be similar to conventional processes. If the received data, at least, includes a portion of discrete data, the slave computation unit 402 may be configured, similar to the master computation unit 302, to search for a result from a prestored table (e.g., Table 1) or one or more operations from a prestored index. The slave computation unit 402 and components thereof are described in greater detail in accordance with FIG. 5.

The slave output values generated respectively by the slave computation modules 114 may be output to and combined by the interconnection unit 108 into an intermediate result vector. In an example where the length of the output vector $L_{i+i}$ is greater than the number of the slave computation modules N, the intermediate result vectors calculated based on different submatrices of the weight matrix may be combined.

Intermediate result vectors generated based on multiple segments of the input vector may be further combined into a merged intermediate vector by the master computation module 112.

The master computation module 112 may be configured to perform one or more operations to the merged intermediate vector to generate the output vector. The operations may include adding a bias to the intermediate result vector, pooling (e.g., max-pooling (MAXPOOLING) or average pooling (AVGPOOLING)), activating with an activation function, sampling, etc. The activation function may be sigmoid function, tanh function, relu function, softmax function, etc.

Referring to FIG. 5, a block diagram illustrates an example master computation unit 302 or an example slave computation unit 402 by which a forward propagation computation of artificial neural networks may be implemented in accordance with aspects of the present disclosure. As depicted, the example master computation unit 302 or the example slave computation unit 402 may include a data type determiner 502 that may be configured to determine the data type of the received MNN data (i.e., discrete data or continuous data). In more detail, the data type determiner 502 may be configured to determine if the received MNN data is continuous data, discrete data, or hybrid data that includes both continuous data and discrete data.

If the received MNN data is determined to be continuous data, following processes at the master computation module 112 and the slave computation modules 114 may be similar to conventional processes. That is, the received MNN data may be further transmitted to a continuous data processor 504 configured to process the received MNN data similar to conventional processes.

If the received MNN data is determined to be discrete data, the MNN data may be further transmitted to a discrete data processor 506. In some examples, the discrete data processor 506 may be configured to look up for a result of an instructed calculation in a prestored table, rather than performing a calculation. For example, a 2-bit discrete data may represent four discrete values (e.g., 00, 01, 10, 11 respectively represents −1, −0.5, 0.125, 2). In some examples, the discrete data processor 506 may be configured to perform arithmetic operations to the discrete data, e.g., addition, multiplication, etc. With respect to each operation such as addition, multiplication, subtraction, division, a table may be respectively created and prestored at the discrete data processor 506. For instance, Table 1 provided above may be prestored for addition. In an example where the discrete data processor 506 may be configured to perform an addition for discrete data 00 and 01, the discrete data processor 506 may be configured to search the result corresponding to −1 and −0.5 and generate the search result −1.5 as the result of addition.

If the receive MNN data is determined to be hybrid data that involves both continuous data and discrete data, the MNN data may be further transmitted to an operation determiner 508. The operation determiner 508 may be configured to determine and select one or more operations from a group of prestored operations (e.g., operation 511A, operation 511B . . . operation 511N). As described above, the group of prestored operations may include bit manipulation operations such as bit shifting, bitwise AND, bitwise XOR (exclusive or), bitwise NOT, etc.

For example, when the MNN data includes a discrete value 01 (representing −0.5 as previously indicated) and a continuous value 16 and the master computation unit 302 (or the slave computation unit 402) is instructed to perform a multiplication operation for the received values (i.e., −0.5× 16), the operation determiner 508 may be configured to select one or more operations corresponding to the discrete value 01 in an index of multiplication operation. For instance, the operation determiner 508 may be configured to select a series of operations including inverting the sign bit of the continuous value (e.g., from 00010000 to 10010000) and right shifting the inverted continuous value by one bit (e.g., from 10010000 to 10001000). A hybrid data processor 510 may be configured to apply the selected series of operations to the continuous value 16 to generate the result.

Figure 6:
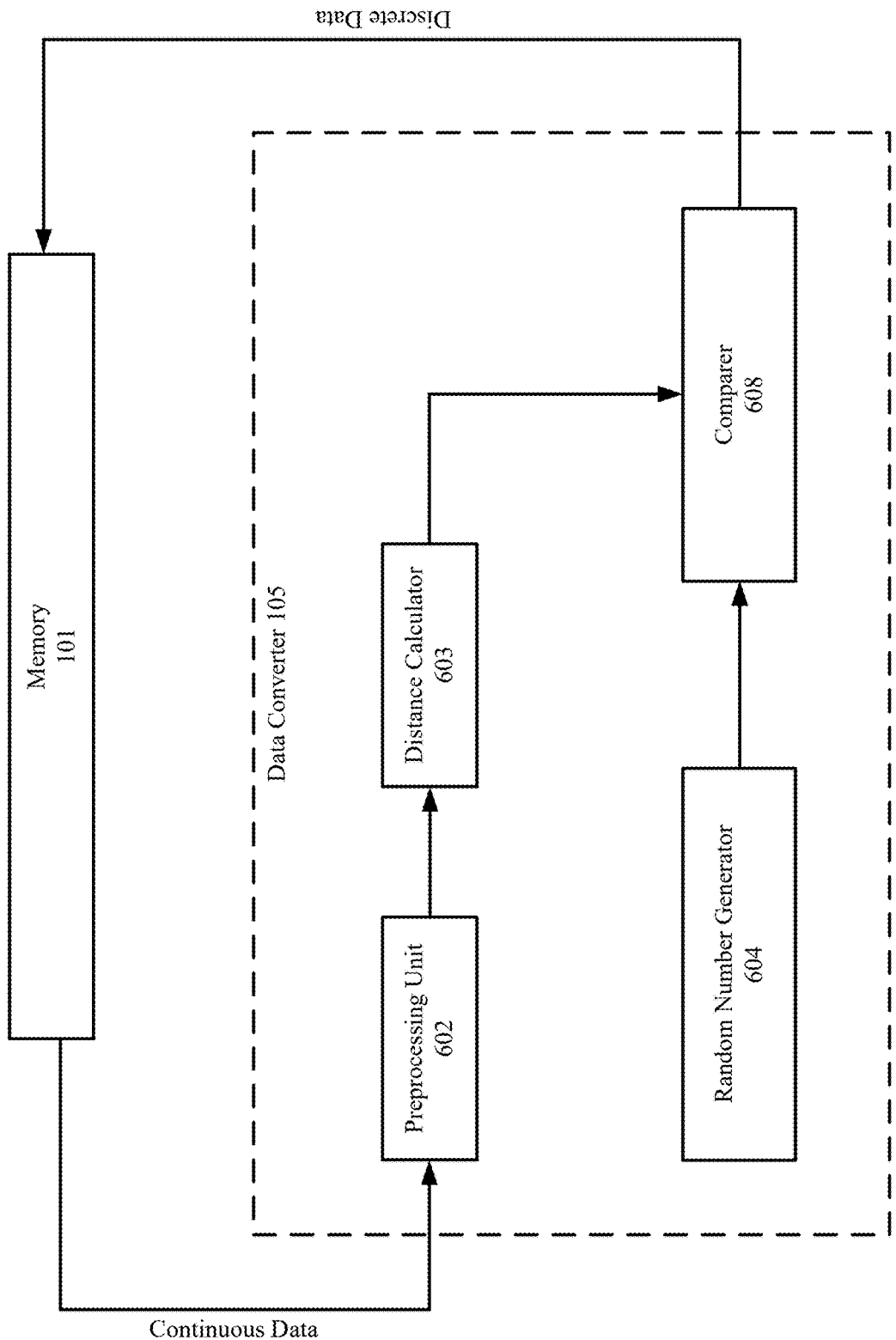
FIG. 6 is a block diagram of the structure of a data converter in the neural network processor for performing a forward propagation computation of artificial neural networks according to embodiments of the present disclosure.

Referring to FIG. 6, a block diagram illustrates an example data converter 105 by which a forward propagation computation of artificial neural networks may be implemented in accordance with aspects of the present disclosure. As depicted, the example data converter 105 may include a preprocessing unit 602, a distance calculator 603, a random number generator 604, and a comparer 608.

As described above, the data converter 105 may receive continuous data from the memory 101 and convert the continuous data into discrete data. The discrete data may then be transmitted back to the memory 101. In more detail, the controller unit 106 may be configured to send one or more instructions to the data converter 105. The instructions may specify the portions of continuous data to be converted into discrete data.

In some examples, a count of the discrete values for the process may be set to a number in the form of $2^n$ where n is an integer equal to or greater than 1. In some other examples, each discrete value may be set a value equal to $2^m$ where m is an integer, e.g., −1, −0.5, 0.125, 2. Further, the discrete values may be preselected, by a system administrator, from a data range, e.g., [−z, z].

The preprocessing unit 602 may be configured to perform a clipping operation to the received continuous data. That is, the preprocessing unit 602 may be configured to only keep the continuous data within the data range. Further, with respect to those continuous values that are greater than the upper limit of the data range (e.g., z), the preprocessing unit 602 may set those continuous values to a value equal to the upper limit (e.g., z). With respect to those continuous values that are less than the lower limit of the data range (e.g., −z), the preprocessing unit 602 may set those continuous values to a value equal to the lower limit (e.g., −z).

For instance, the received continuous data may include 10 continuous values (e.g., 0, 1, 2, 3, 4, 5, 6, 7, 8 and 9) and the data range may be set to [−4, 4]. The preprocessing unit 602 may be configured to keep the continuous values within the data range and set the continuous values that are greater than 4 to 4. Thus, the preprocessed data may be generated as 0, 1, 2, 3, 4, 4, 4, 4, 4, and 4. In some other examples, the data range may be set to [−1, 1] or [−2, 2].

Thus, the preprocessed values may be generated by the preprocessing unit 602. The preprocessed values that includes one or more continuous values may be transmitted to a distance calculator 603 for further operations.

The distance calculator 603 may be configured to calculate one or more distance values between the preprocessed values and the discrete values. A distance value may refer to an absolute value of a subtraction result between a preprocessed value and a discrete value. For example, the discrete values may be set as a number of values with the data range, e.g., −1, −0.5, 0.125, 2. A table of the distance values are provided below.

TABLE 2

(Distances between preprocessed values and discrete values)

| | Discrete value: −1 | Discrete value: −0.5 | Discrete value: 0.125 | Discrete value: 2 |
|---|---|---|---|---|
| Preprocessed value: 0 | Distance: 1 | Distance: 0.5 | Distance: 0.125 | Distance: 2 |
| Preprocessed value: 1 | Distance: 2 | Distance: 1.5 | Distance: 0.875 | Distance: 1 |
| Preprocessed value: 2 | Distance: 3 | Distance: 2.5 | Distance: 1.875 | Distance: 0 |
| Preprocessed value: 3 | Distance: 4 | Distance: 3.5 | Distance: 2.875 | Distance: 1 |
| Preprocessed value: 4 | Distance: 5 | Distance: 4.5 | Distance: 3.875 | Distance: 2 |
| Preprocessed value: 4 | Distance: 5 | Distance: 4.5 | Distance: 3.875 | Distance: 2 |
| Preprocessed value: 4 | Distance: 5 | Distance: 4.5 | Distance: 3.875 | Distance: 2 |
| Preprocessed value: 4 | Distance: 5 | Distance: 4.5 | Distance: 3.875 | Distance: 2 |
| Preprocessed value: 4 | Distance: 5 | Distance: 4.5 | Distance: 3.875 | Distance: 2 |
| Preprocessed value: 4 | Distance: 5 | Distance: 4.5 | Distance: 3.875 | Distance: 2 |

The distance values may then be further transmitted to the comparer 608.

In some examples, the comparer 608 may be configured to generate one or more output discrete values as results of the conversion. In more detail, with respect to a continuous value, a discrete value that corresponds to a smallest distance value may be determined to represent the continuous value. For example, with respect to continuous value 0, the discrete value that corresponds to the smallest distance value is 0.125. The discrete value 0.125 may be determined to represent the continuous value 0 and generated as a part of the output discrete values.

Alternatively, with respect to a continuous value, the comparer 608 may be configured to calculate a normalization probability of either one of the two discrete values that correspond to the two smallest distance values. For example, with respect to continuous value 0, the comparer 608 may be configured to calculate the normalization probability for discrete values −0.5 or 0.125. The comparer 608 may then compare the normalization probability with a random number between 0 and 1, which is generated by a random number generator 604. If the normalization probability is greater than the random number, the comparer 608 may output the discrete value that corresponds to the normalization probability; otherwise, the compare 608 may output the other discrete value.

Figure 7:
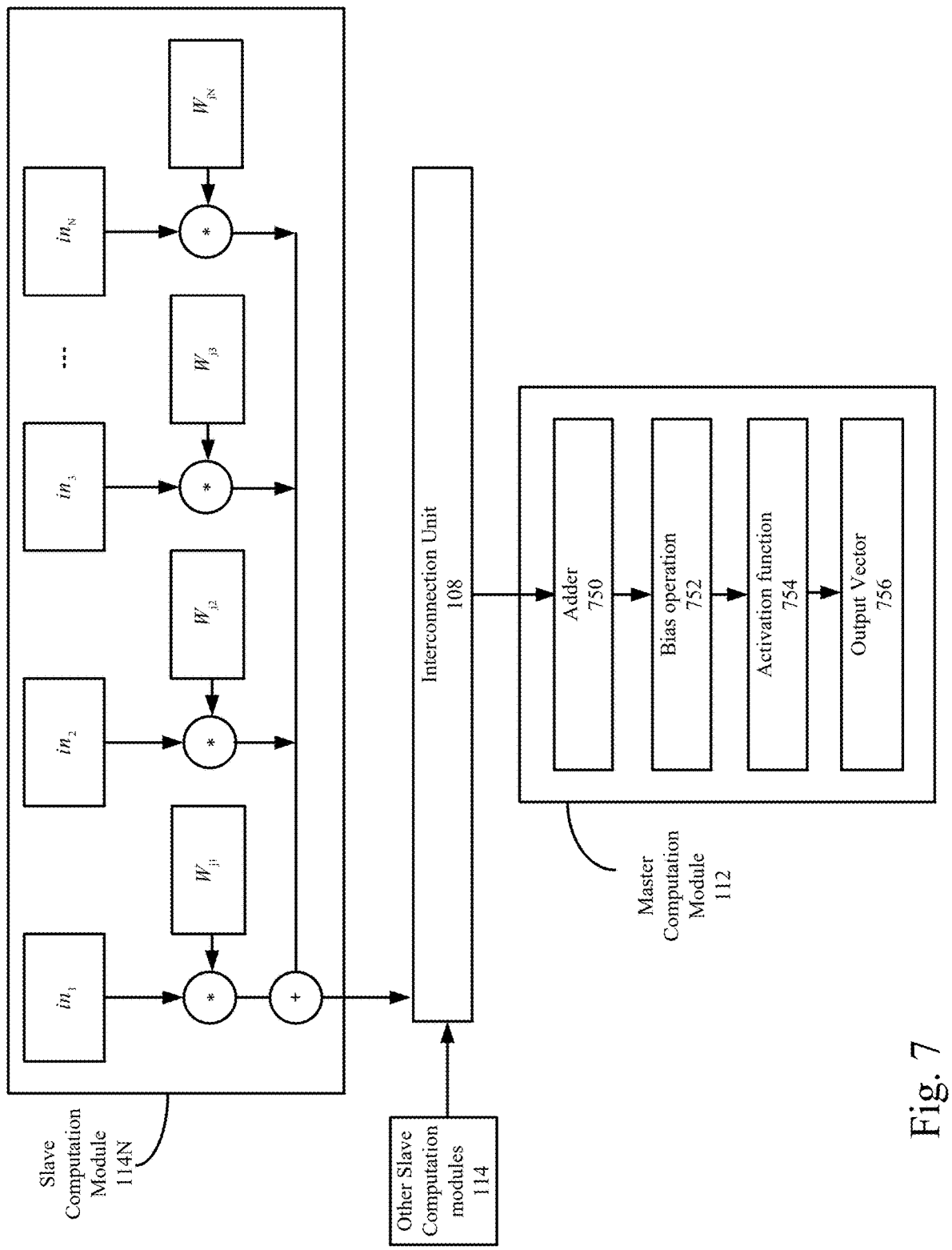
FIG. 7 is a block diagram of the forward propagation computation process of neural networks according to embodiments of the present disclosure.

FIG. 7 is a block diagram of the forward propagation computation process of neural networks according to embodiments of the present disclosure. As described above, a $j^{th}$ slave computation module 114J may be configured to multiply the input vector ($in_1$, $in_2$, $in_3$, . . . $in_N$) by the respective weight vector stored in the weight value caching unit 408, e.g., ($W_{j1}$, $W_{j2}$, $W_{j3}$, . . . $W_{jj}$, . . . $W_{jN}$), to generate a slave output value. The slave output values may be transmitted to the interconnection unit 108 and combined into an intermediate result vector.

The intermediate result vector may be further transmitted to the master computation module 112. Multiple intermediate result vectors generated based on the segments of the input vector may be further combined by the master computation module 112 to generate a merged intermediate vector. For example, the master computation module 112 may be configured to perform a vector addition on the received intermediate result vectors to generate the merged intermediate vector. The master computation module 112 may be configured to perform a bias operation by adding a bias value to the merged intermediate vector and to apply an activation function to the biased merged intermediate vector to generate the output vector.

Referring to FIG. 8, a flow chart shows aspects of an example method for forward propagation of a multilayer neural network in accordance with aspects of the present disclosure. The method may be performed by one or more components of the apparatus of FIG. 1B and the components thereof in FIGS. 3, 4, 5, and 6.

At block 802, method 800 may include receiving, by the master computation module 112, one or more groups of MNN data from a direct memory access unit. The one or more groups of MNN data may include input data and one or more weight values. At least a portion of the input data and the weight values may be stored as discrete values.

In some examples, the data converter 105 may be configured to convert continuous data to discrete data and transmit the discrete data to the memory 101.

At block 804, method 800 may include transmitting, by the master computation module 112, the MNN data to one or more slave computation modules 114 via the interconnection unit 108. The one or more slave computation modules may be configured to calculate one or more groups of slave output values based on a data type of each of the one or more groups of MNN data. The data type may refer to whether the MNN data is discrete data or continuous data. In some examples, the slave computation modules 114 may be configured to parallelly calculate the one or more groups of slave output values.

In some examples, the slave computation unit 402 of the slave computation module 114N may be configured to receive one or more groups of micro-instructions from the controller unit 106. The slave computation unit 402 may be configured to perform arithmetic logical operations that respectively correspond to the data type of the MNN data. The slave neuron caching unit 406 of the slave computation module 114N may be configured to temporarily store the input data and the slave output values. Similarly, the weight value caching unit 408 of the slave computation module 114N may be configured to temporarily store the weight values.

The interconnection unit 108 may be configured to combine the one or more groups of slave output values to generate one or more intermediate result vectors.

At block 806, the method 800 may include calculating, by the master computation module 112, a merged intermediate vector based on the data type of each of the one or more groups of MNN data. That is, the master computation module 112 may be configured to calculate the merged intermediate vector based on the data type of the MNN data.

More specifically, the master neuron caching unit 306 of the master computation module 112 may be configured to cache or temporarily store the input data and the output vector. The master computation unit 302 may be configured to perform one or more operations that correspond to the data type of the MNN data. In more detail, the operation determiner 508 may be configured to determine an operation to be performed based on the data type of the input data. The hybrid data processor 510 may be configured to perform the determined operation accordingly.

At block 808, the method 800 may include generating, by the master computation module 112, an output vector based on the merged intermediate vector. In some examples, the master computation module 112 may be configured to perform an operation such as adding a bias value to the merged intermediate vector; activating the merged intermediate vector with an activation function, wherein the activation function is a function selected from the group consisting of non-linear sigmoid, tanh, relu, and softmax; outputting a predetermined value based on a comparison between the merged intermediate vector and a random number; and pooling the merged intermediate vector.

The utilization of the apparatus and instruction set for performing the forward computation of artificial neural networks eliminates the defects caused by lower performance of CPU and GPU operation as well as high overhead of front-end transcoding, which effectively improvs the support to forward computations of multi-layer artificial neural networks.

In addition, the utilization of a specific on-chip cache for the forward computation of multi-layer artificial neural network thoroughly explores the reusability of input neurons and weight data and avoids the repeatedly reading of data from memory. The requirement for memory access bandwidth is also lowered and thus the memory bandwidth will not become a bottleneck for performance of the forward computation of multi-layer artificial neural networks.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for forward propagation of a multilayer neural network (MNN), comprising:
    a computation circuit that includes a master computation circuit and one or more slave computation circuits,
    wherein the master computation circuit configured to:
        receive one or more groups of MNN data that include input data and weight values,
            wherein at least a portion of the one or more groups of MNN data are binary codes included in a prestored lookup table, wherein each of the binary codes respectively represents a user-assigned value and one of one or more prestored bitwise operations,
            wherein an association between the binary codes, the user-assigned values, and the one or more prestored bitwise operations is included in the prestored lookup table, and
            wherein other portions of the one or more groups of MNN data are binary numbers in a base-2 numeral system,
        transmit the MNN data to an interconnection circuit; and
    wherein the one or more slave computation circuits configured to
        receive the one or more groups of MNN data, and
        calculate one or more groups of slave output values,
            wherein the master computation circuit is further configured to:
                identify the binary codes in the one or more groups of MNN data by searching the prestored lookup table,
                with respect to each of the binary codes, look up, in the prestored lookup table, to determine one of the prestored bitwise operations that corresponds to the binary code,
                calculate a merged intermediate vector between one of the binary codes and one of the binary numbers by performing one of the prestored bitwise operations that corresponds to the binary code to the binary number, and
                generate an output vector based on the merged intermediate vector; and
    a controller circuit configured to transmit one or more micro-instructions to the master computation circuit and the one or more slave computation circuits.

2. The apparatus of claim 1, wherein the interconnection circuit is configured to combine the one or more groups of slave output values to generate one or more intermediate result vectors.

3. The apparatus of claim 1, wherein the one or more slave computation circuits are configured to parallelly calculate the one or more groups of slave output values based on the input data and the weight values.

4. The apparatus of claim 1, wherein the master computation circuit is configured to perform one operation selected from a group consisting of:
    adding a bias value to the merged intermediate vector;
    activating the merged intermediate vector with an activation function, wherein the activation function is a function selected from the group consisting of non-linear sigmoid, tanh, relu, and softmax;
    outputting a predetermined value based on a comparison between the merged intermediate vector and a random number; and
    pooling the merged intermediate vector.

5. The apparatus of claim 1, wherein the interconnection circuit is connected to the master computation circuit and the one or more slave computation circuits and exchanges data between the master computation circuit and the one or more slave computation circuits, wherein the data includes the one or more groups of MNN data and the one or more groups of slave output values.

6. The apparatus of claim 1, wherein the master computation circuit includes:
    a master neuron caching circuit configured to temporarily store the input data and the output vector; and
    a master computation sub-circuit configured to:
    perform a bit manipulation operation that corresponds to each of the binary codes.

7. The apparatus of claim 1, wherein the master computation circuit includes a master data dependency relationship determination circuit configured to prevent a micro-instruction from being executed based on a determination that a conflict exists between the micro-instruction and other micro-instructions.

8. The apparatus of claim 1, wherein each of the slave computation circuits includes a slave computation sub-circuit configured to receive one or more groups of micro-instructions from the controller circuit;

a slave data dependency relationship determination circuit configured to perform data exchange operations based on a determination that no conflict exists between the data exchange operations, wherein the data exchange operations include reception operations from the master computation circuit and transmission operations to the master computation circuit;

a slave neuron caching circuit configured to temporarily store the input data and the slave output values; and a weight value caching circuit configured to temporarily store the weight values.

9. The apparatus of claim 8, wherein the slave data dependency relationship determination circuit is configured to:

determine whether there is a dependent relationship between a first micro-instruction which has not been executed and a second micro-instruction which is being executed; and if there is no dependent relationship, allow the first micro-instruction to be executed immediately; otherwise, if the dependent relationship exists, the first micro-instruction will not be allowed to execute until the execution of all micro-instructions is completed.

10. The apparatus of claim 6, wherein the master computation sub-circuit includes an operation determiner circuit configured to determine one of the prestored bitwise operations corresponding to each of the binary codes; and a hybrid data circuit configured to perform the determined prestored bitwise operation.

11. The apparatus of claim 8, wherein the slave computation sub-circuit includes an operation determiner circuit configured to determine one of the prestored bitwise operations to be performed corresponding to each of the binary codes; and a hybrid data circuit configured to perform the determined prestored bitwise operation.

12. The apparatus of claim 1, further comprising a data converter circuit configured to:

receive the binary numbers, convert the binary numbers to the binary codes, and transmit the binary codes to the master computation circuit and the one or more slave computation circuits.

13. The apparatus of claim 12, wherein the data converter circuit includes a preprocessing circuit configured to clip a portion of the input data that is within a predetermined range to generate preprocessed data;

a distance calculator circuit configured to calculate multiple distance values between the preprocessed data and multiple binary codes; and a comparer circuit configured to compare the multiple distance values to output one or more of the multiple binary codes.

14. The apparatus of claim 12, wherein the data converter circuit is configured to receive the binary numbers from an external storage device.

15. The apparatus of claim 1, further comprising a data converter circuit configured to:

receive the binary numbers from an external storage device, convert the binary numbers to the binary codes, and transmit the binary codes to the external storage device.

16. A method for forward propagation of a multilayer neural network (MNN), comprising:

receiving, by a master computation circuit of a computation circuit, one or more groups of MNN data that include input data and weight values from a direct memory access circuit, wherein at least a portion of the one or more groups of MNN data are binary codes included in a prestored lookup table, wherein each of the binary codes respectively represents a user-assigned value and one of one or more prestored bitwise operations, wherein an association between the binary codes, the user-assigned values, and the one or more prestored bitwise operations is included in the prestored lookup table, and wherein other portions of the one or more groups of MNN data are binary numbers in a base-2 numeral system;

calculating, by one or more slave computation circuits of the computation circuit, one or more groups of slave output values;

identifying, by the master computation circuit, the binary codes in the one or more groups of MNN data by searching the prestored lookup table, calculating, by the master computation circuit, the merged intermediate vector between one of the binary codes and one of the binary numbers by looking up, in the prestored lookup table, one of the prestored bitwise operations that corresponds to the binary code and performing one of the prestored bitwise operations that corresponds to the binary code to the binary number, and generating, by the master computation circuit, an output vector based on the merged intermediate vector.

17. The method of claim 16, further comprising:

combining, by an interconnection circuit, the one or more groups of slave output values to generate one or more intermediate result vectors.

18. The method of claim 16, further comprising:

parallelly calculating, by the one or more slave computation circuits, the one or more groups of slave output values based on the input data and the weight values.

19. The method of claim 16, further comprising performing, by the master computation circuit, one operation selected from a group consisting of:

adding a bias value to the merged intermediate vector;

activating the merged intermediate vector with an activation function, wherein the activation function is a function selected from the group consisting of non-linear sigmoid, tanh, relu, and softmax;

outputting a predetermined value based on a comparison between the merged intermediate vector and a random number; and pooling the merged intermediate vector.

20. The method of claim 16, further comprising:

temporarily storing, by a master neuron caching circuit of the master computation circuit, the input data and the output vector;

and performing, by the master computation sub-circuit of the master computation circuit, a bit manipulation operation that corresponds to each of the binary codes.

21. The method of claim 16, further comprising preventing, by a master data dependency relationship determination circuit of the master computation circuit, a micro-instruction from being executed based on a determination that a conflict exists between the micro-instruction and other micro-instructions.

22. The method of claim 16, further comprising receiving, by a slave computation sub-circuit of each of the slave computation circuits, one or more groups of micro-instructions from a controller circuit;

performing, by a slave data dependency relationship determination circuit of each of the slave computation circuits, data exchange operations based on a determination that no conflict exists between the data exchange operations, wherein the data exchange operations include reception operations from the master computation circuit and transmission operations to the master computation circuit;

temporarily storing, by a slave neuron caching circuit of each of the slave computation circuits, the input data and the slave output values; and temporarily storing, by a weight value caching circuit of each of the slave computation circuits, the weight values.

23. The method of claim 22, further comprising:

determining, by the slave data dependency relationship determination circuit, whether there is a dependent relationship between a first micro-instruction which has not been executed and a second micro-instruction which is being executed; and if there is no dependent relationship, allowing, by the slave data dependency relationship determination circuit, the first micro-instruction to be executed immediately; otherwise, if the dependent relationship exists, the first micro-instruction will not be allowed to execute until the execution of all micro-instructions is completed.

24. The method of claim 20, further comprising:

determining, by an operation determiner circuit of the master computation sub-circuit, one of the prestored bitwise operations corresponding to each of the binary codes to be performed; and performing, by a hybrid data circuit of the master computation sub-circuit, the determined prestored bitwise operation.

25. The method of claim 22, further comprising:

determining, by an operation determiner circuit of the slave computation sub-circuit, one of the prestored bitwise operations to be performed corresponding to each of the binary codes;

performing, by a hybrid data circuit of the slave computation sub-circuit, the determined prestored bitwise operation.

26. The method of claim 16, further comprising

Receiving, by a data converter circuit, the binary numbers;

converting, by the data converter circuit, the binary numbers to the binary codes; and transmitting, by the data converter circuit, the binary codes to the master computation circuit and the one or more slave computation circuits.

27. The method of claim 26, further comprising receiving, by the data converter circuit, the binary numbers from an external storage device.

28. The method of claim 16, further comprising receiving, by a data converter circuit, the binary numbers from an external storage device;

converting, by the data converter circuit, the binary numbers to the binary codes; and transmitting, by the data converter circuit, the binary codes to the external storage device.

29. The method of claim 26, further comprising:

clipping, by a preprocessing circuit of the data converter circuit, a portion of the input data that is within a predetermined range to generate preprocessed data;

calculating, by a distance calculator circuit of the data converter circuit, multiple distance values between the preprocessed data and multiple binary codes; and comparing, by a comparer circuit of the data converter circuit, the multiple distance values to output one or more of the multiple binary codes.

\* \* \* \* \*